United States Patent
Lin et al.

(10) Patent No.: US 10,444,416 B2
(45) Date of Patent: Oct. 15, 2019

(54) NEAR INFRARED ABSORBING AGENT AND METHOD OF MAKING NEAR INFRARED ABSORBING AGENT

(71) Applicants: Chhiu-Tsu Lin, Sycamore, IL (US); Tsehaye Eyassu, DeKalb, IL (US)

(72) Inventors: Chhiu-Tsu Lin, Sycamore, IL (US); Tsehaye Eyassu, DeKalb, IL (US)

(73) Assignee: Board of Trustees of Northern Illinois University, DeKalb, IL (US)

( * ) Notice: Subject to any disclaimer, the term of this patent is extended or adjusted under 35 U.S.C. 154(b) by 713 days.

(21) Appl. No.: 14/998,316

(22) Filed: Dec. 24, 2015

(65) Prior Publication Data
US 2017/0183240 A1    Jun. 29, 2017

(51) Int. Cl.
*C01G 41/02* (2006.01)
*G02B 5/20* (2006.01)
*C01G 41/00* (2006.01)

(52) U.S. Cl.
CPC .............. *G02B 5/208* (2013.01); *C01G 41/00* (2013.01); *C01P 2002/72* (2013.01); *C01P 2002/84* (2013.01); *C01P 2002/85* (2013.01); *C01P 2004/04* (2013.01); *C01P 2004/51* (2013.01); *C01P 2004/52* (2013.01); *C01P 2004/54* (2013.01); *C01P 2004/62* (2013.01); *C01P 2004/64* (2013.01)

(58) Field of Classification Search
CPC ....... G02B 5/208; C01G 4/02; C01P 2002/72; C01P 2002/86; C01P 2004/64
See application file for complete search history.

(56) References Cited

U.S. PATENT DOCUMENTS

| 8,268,202 | B2 | 9/2012 | Mamak et al. | |
| 2010/0239872 | A1* | 9/2010 | Koyama | B82Y 30/00 428/448 |
| 2011/0248225 | A1* | 10/2011 | Mamak | C01G 41/006 252/587 |
| 2015/0346404 | A1* | 12/2015 | Bak | H01L 27/14618 348/342 |
| 2016/0178804 | A1* | 6/2016 | Shen | C01G 39/02 252/587 |

OTHER PUBLICATIONS

Park, B.H. et al., "Lanthanum-substituted bismuth titanate for use in non-volatile memories", Nature, vol. 401, pp. 682-684, (1999).
Dimos, D. et al., "Perovskite thin films for high-frequency capacitor applications", Annual Review of Material Science, vol. 28, pp. 397-419, (1998).

(Continued)

*Primary Examiner* — Jun Li
(74) *Attorney, Agent, or Firm* — Evan Law Group LLC

(57) ABSTRACT

A method of preparing $Cs_xWO_3$ particles comprises heating a composition containing (1) cesium, (2) tungsten, (3) a solvent, and (4) a fatty acid, at a temperature of at least 200° C., to produce $Cs_xWO_3$ particles, with x=0.31-0.33. The solvent comprises benzyl alcohol, and the fatty acid comprises a fatty acid having 10 to 30 carbon atoms.

14 Claims, 13 Drawing Sheets

(56) References Cited

OTHER PUBLICATIONS

Ellis, A.B. et al., "Optical to electrical energy conversion", Journal of the American Chemical Society, vol. 98, pp. 6855-6866, (1976).
Sharan, A. et al., "Large optical nonlinearities in $BiMnO_3$ thin films", Applied Physics Letters, vol. 83, No. 25, pp. 5169-5171, (2003).
Bamwenda, G.R. et al., "The effect of selected reaction parameters on the photoproduction of oxygen and hydrogen from a $WO_3$-$FE^{2+}$—$Fe^{3+}$ aqueous suspension", Journal of Photochemistry and Photobiology A: Chemistry, vol. 122, pp. 175-183, (1999).
Granqvist, C.G. et al., "Electrochromic tungsten oxide films: Review of progress 1993-1998", Solar Enemy Materials & Solar Cells, vol. 60, pp. 201-262, (2000).
Shanks, H.R. et al., "Electrical properties of the tungsten bronzes", Advances in Chemistry, vol. 39, chapter 22, pp. 237-245, (1963).
Takeda, H. et al., "Near infrared absorption of tungsten oxide nanoparticle dispersions", Journal of the American Ceramic Society, vol. 90, No. 12, pp. 4059-4061, (2007).
Guo, C. et al., "Facile synthesis of homogeneous $Cs_xWO_3$ nanorods with excellent low-emissivity and NIR shielding property by a water controlled-release process", Journal of Materials Chemistry, vol. 21, pp. 5099-5105, (2011).
Liu, J-X. et al., "Microstructure and electrical-optical properties of cesium tungsten oxides synthesized by solvothermal reaction followed by ammonia annealing", Journal of Solid State Chemistry, vol. 183, pp. 2456-2460, (2010).
Chen, C-J. et al., "Preparation and near-infrared photothermal conversion property of cesium tungsten oxide nanoparticles", Nanoscale Research Letters, vol. 8, No. 57, pp. 1-8, (2013).
Guo, C. et al., "Novel synthesis of homogenous CsxWO3 nanorods with excellent NIR shielding properties by a water controlled-release solvothermal process", Journal of Materials Chemistry, vol. 20, pp. 8227-8229, (2010).
Adachi, K. et al., "Activation of plasmons and polarons in solar control cesium tungsten bronze and reduced tungsten oxide nanoparticles", Journal of Material Research, vol. 27, issue 6, pp. 965-970, (2012).
Kim, Y.J. et al., "Effect of $Cs_xWO_3$ nanoparticles content and atomic ratio for near infrared cut-off characteristics", 2012 $3^{rd}$ International Conference on Biology, Environment and Chemistry IPCBREE, vol. 46, No. 9, pp. 1-5, (2012).
Guo, C. et al., "Solvothermal synthesis of caesium tungsten bronze in the presence of various organic acids and its NIR absorption properties", ICC3: Symposium 2A: Novel Chemical Processing; Sol-Gel and Solution-Based Processing, IOP Conference Series: Materials Science and Engineering, vol. 18, pp. 1-4, (2011).
Guo, C. et al., "Synthesis of one-dimensional potassium tungsten bronze with excellent near-infrared absorption property", ACS Applied Materials & Interfaces, vol. 3, pp. 2794-2799, (2011).
Niederberger, M., "Nonaqueous Sol-Gel routes to metal oxide nanoparticles", Accounts of Chemical Research, vol. 40, No. 9, pp. 793-800, (2007).
Pinna, N. et al., "The "benzyl alcohol route": An elegant approach towards doped and multimetal oxide nanocrystals", Journal of Sol-Gel Science Technology, vol. 57, pp. 323-329, (2011).
Niederberger, M. et al., "A general soft-chemistry route to perovskites and related materials: Synthesis of $BaTiO_3$, $BaZrO_3$, and $LiNbO_3$ nanoparticles", Angewandte Chemie International Edition, vol. 43, No. 17, pp. 2270-2273, (2004).
Wang, J. et al., "Synthesis and characterization of perovskite $PbTiO_3$ nanoparticles with solution processability", Journal of Materials Chemistry, vol. 20, pp. 5945-5949, (2010).
Niederberger, M. et al., "Benzyl alcohol and titanium tetrachloride-A versatile reaction system for the nonaqueous and low-temperature preparation of crystalline and luminescent titania nanoparticles", Chemistry of Materials, vol. 14, No. 10, pp. 4364-4370, (2002).
Bilecka, I. et al., "Kinetic and thermodynamic aspects in the microwave-assisted synthesis of ZnO nanoparticles in benzyl alcohol", ACS Nano, vol. 3, No. 2, pp. 467-477, (2009).
Niederberger, M. et al., "Organic reaction pathways in the nonaqueous synthesis of metal oxide nanoparticles", Chemistry—A European Journal, vol. 12, pp. 7282-7302, (2006).
Yang, J-G. et al., "Preparation of oleic acid-capped copper nanoparticles", Chemistry Letters, vol. 35, No. 10, pp. 1190-1191, (2006).
Wang, Y. et al., "Oleic acid as the capping agent in the synthesis of noble metal nanoparticles in imidazolium-based ionic liquids", Chemical Communications, issue 24, pp. 2545-2547, (2006).
Wang, C.Y. et al., "Facile method to synthesize oleic acid-capped magnetite nanoparticles", Chinese Chemical Letters, vol. 21, pp. 179-182, (2010).
Moon, K, et al., "Near infrared shielding properties of quaternary tungsten bronze nanoparticle $Na_{0.11} \cdot Cs_{0.22}WO_3$", Bulletin Korean Chemical Society, vol. 34, No. 3, pp. 731-734, (2013).
Zhu, J. et al., "Hexagonal single crystal growth of $WO_3$ nanorods along a [110] axis with enhanced adsorption capacity", Chemical Communication, vol. 47, pp. 4403-4405, (2011).
Rajagopal, S. et al., "Controlled growth of WO3 nanostructures with three different morphologies and their structural, optical, and photodecomposition studies", Nanoscale Research Letters, vol. 4, pp. 1335-1342, (2009).
Levy, M. et al., "Correlating magneto-structural properties to hyperthermia performance of highly monodisperse iron oxide nanoparticles prepared by a seeded-growth route", Chemistry of Materials, vol. 23, pp. 4170-4180, (2011).
Buonsanti, R. et al., "Hyperbranched anatase $TiO_2$ nanocrystals: Nonaqueous synthesis, growth mechanism, and exploitation in dye-sensitized solar cells", Journal of the American Chemical Society, vol. 133, pp. 19216-19239, (2011).
Buonsanti, R. et al., "Chemistry of doped colloidal nanocrystals", Chemistry of Materials, vol. 25, pp. 1305-1317, (2013).
Lounis, S.D. et al., "Defect chemistry and plasmon physics of colloidal metal oxide nanocrystals", The Journal of Physical Chemistry Letters, vol. 5, pp. 1564-1574, (2014).
Mattox, T.M. et al., "Influence of shape on the surface plasmon resonance of tungsten bronze nanocrystals", Chemistry of Materials, vol. 26, pp. 1779-1784, (2014).
Mamak, M. et al., "Thermal plasma synthesis of tungsten bronze nanoparticles for near infra-red absorption applications", Journal of Materials Chemistry, vol. 20, pp. 9855-9857, (2010).
Buonsanti, R. et al., "Nonhydrolytic synthesis of high-quality anisotropically shaped brookite TiO2 nanocrystals", Journal of the American Chemical Society, vol. 130, pp. 11223-11233, (2008).
Eyassu, T. et al., "Facile solvothermal synthesis of NIR absorbing $Cs_xWO_3$ nanorods by benzyl alcohol route", Materials Research Express, vol. 2, No. 1, pp. 1-13, (2015).
Definition of "Oleic acid" printed from Wikipedia, the free encyclopedia on Dec. 8, 2015, found at https://en.wikipedia.org/wiki/Oleic_acid.
Eyassu, T., "Inorganic/organic hybrid nanocomposite coating applications: Formulation, characterization, and evaluation", Proquest Dissertations Publishing, pp. 1-207, (2014). (published Feb. 25, 2015).
Zayat, M. et al., "Preventing UV-light damage of light sensitive materials using a highly protective UV-absorbing coating", Chemical Society Reviews, vol. 36, No. 8, pp. 1270-1281, (2007).
Keller, M. "Smart window coating selects what light to let in", found at http://txchnologist.com/post/37785024627/smart-window-coating-selects-what-light-to-let-in, 8 pages, Dec. 12, 2012.
Ultimate Windowing Tinting, found at www.ultimatewindowtinting.com/services-window-tinting/commercial-tinting, 2 pages, (2017).
AZoNano, "AdNano ITO nanostructured indium tin oxide, applications, properties and product availability, supplier data by Degussa", AZo Nano, found at www.azonano.com/article.aspx?ArticleID=1601, 8 pages, (2006).

\* cited by examiner

NEAR INFRARED ABSORBING AGENT AND METHOD OF MAKING NEAR INFRARED ABSORBING AGENT

BACKGROUND

Pervoskites compounds have been widely studied because of their interesting chemical, electrochemical and electronic properties. They are adapted to a number of applications such as in nonvolatile memories, photoelectrochemical cells, thin-film capacitors, and non-linear optics [1-4]. Recently, there has been growing interest in the use of near infrared (780-2500 nm) absorbing pervoskite materials in solar heat shielding applications. Tungsten trioxide ($WO_3$) possesses a wide band gap that ranges from 2.6 to 3.0 eV [5, 6] and they are transparent in visible and near infrared (NIR) light. However, a strong NIR absorption property could be achieved using systematic induction of free electrons into $WO_3$ crystal by ternary elements addition [7, 8]. In recent studies, the nanosized metal doped tungsten oxides ($M_xWO_3$, where 0.1<x<1), termed as tungsten bronze, has emerged as a promising material for numerous applications such as solar heat-shielding [8, 9], electrochromic devices [10] and biomedical study [11]. Cesium tungsten bronze ($Cs_{0.33}WO_3$) among other metal tungsten bronze nanoparticles have shown an excellent absorption in near infrared (NIR) spectral region (700-3,000 nm) with high optical transparency in the visible spectral region (380-700 nm) [8, 9, 12]. Tungsten bronze provides a superior NIR absorption in comparison to other transparent conductive oxides, such as tin doped indium oxide (ITO), antimony doped tin oxide (ATO), and non-transparent deeply colored lanthanum hexaboride ($LaB_6$) [13-15]. The reasons behind the origin of remarkable NIR absorption by $Cs_xWO_3$ (x=0.15, 0.25, and 0.33) as well as $WO_{2.72}$ was investigated using Mie scattering theory by Adachi and Asahi [14]. The paper reported that the localized surface plasmon resonance and polarons of localized electrons contribute to NIR absorption of cesium tungsten bronze nanoparticles.

In recent years, NIR shielding $Cs_{0.33}WO_3$ had been synthesized mainly by two methods: solid state reaction [8, 14, 15] and high pressure wet-chemical routes (solvothermal and hydrothermal) [9, 10, 12, 16, 17]. Other reported synthesis methods include, stirred bead milling process [11] and inductively coupled thermal plasma technology [13]. The widely used, traditional solid state reaction method requires high temperature and harsh reaction conditions. The size of nanoparticles is often not well controlled and the synthesis method requires extra steps which become more tedious for large scale. Furthermore, the reported low reaction temperature methods such as hydrothermal and solvothermal processes require long reaction time (usually more than 20 hour) to obtain homogenous $Cs_xWO_3$ nanorods.

One of the major challenges in nanoparticle synthesis is developing rational strategies to control size, shape, stoichiometry composition, and structure. In nonaqueous solution routes to metal oxide nanoparticles, like solvothermal process, the role of organic solvent is important in obtaining single-phase products. Benzyl alcohol as solvent has shown an attractive reaction approach for synthesis of homogeneous ternary, multi-metal and doped oxide nanoparticles [19, 23, 24]. It acts as a solvent, ligand and reactant in dissolving precursors, determining reaction pathways, and forming metal oxide, respectively.

SUMMARY

In a first aspect, the present invention is a method of preparing CsxWO3 particles comprising heating a composition containing (1) cesium, (2) tungsten, (3) a solvent, and (4) a fatty acid. The heating is carried out at a temperature of at least 200° C., to produce $Cs_xWO_3$ particles, with x=0.31-0.33. The solvent comprises benzyl alcohol, and the fatty acid comprises a fatty acid having 10 to 30 carbon atoms.

In a second aspect, the present invention is $Cs_xWO_3$ particles, with x=0.31-0.33, produced by the method.

In a third aspect, the present invention is $Cs_xWO_3$ particles, with x=0.31-0.33. At least 95% of particles have a particle size of 50 to 150 nm as determined by dynamic light scattering, and a sample of the particles has a peak in the visible light transmittance of at least 75% and a transmittance at 1400 nm of at most 20%.

DEFINITIONS

The term "aspect ratio" means the ratio of the shortest axis of an object to the longest axis of the object, where the axes are not necessarily perpendicular.

The term "visible light" means light have a wavelength of 400 to 700 nm.

DETAILED DESCRIPTION

Figure 1:
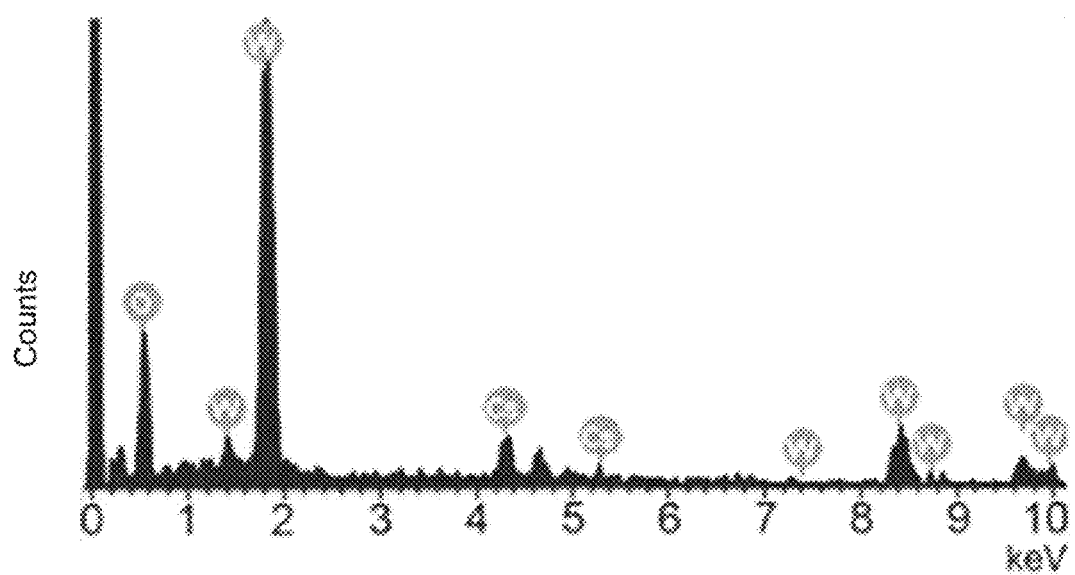
FIG. 1 is an EDS line spectra of $Cs_xWO_3$ synthesized by solvothermal process, at 240° C. for 2 hours.

We have studied synthesis of cesium tungsten oxide ($Cs_xWO_3$) particles using solvothermal process. To achieve a short synthesis time, a solvothermal method based on benzyl alcohol was followed as an attractive approach for the growth of nanoparticles in the presence of a small percentage of fatty acid. Previous works on the synthesis of metal oxide nano-crystals have shown that benzyl alcohol is a versatile solvent and reactant for controlling crystallization and stabilization. The presence of long chain surface capping agent, such as a fatty acid can provide good solubility and stability of nanoparticles in the solvent.

A process using a 2 to 4 hour solvothermal method for facile synthesis of $Cs_xWO_3$ nanorods is realized that gives high crystallinity, high nanoparticle stability, and successful size and shape control. Synthesis of hexagonal cesium tungsten oxide nanoparticles with different oleic acid amounts, different reaction times, and different oven temperatures were carried out. The particle size and distribution, structure and morphology, stoichiometry composition and optical properties of $Cs_xWO_3$ nanorods were characterized by different analytical and physical techniques.

Hexagonal cesium tungsten bronze, $Cs_xWO_3$ nanoparticles were synthesized in 2 hour by a solvothermal process using benzyl alcohol route in the presence of oleic acid as a capping agent. Samples prepared by addition of 10 vol. % oleic acid and at a reaction temperature of 240° C. gave a uniform size distribution with an average particle size ~80 nm. The UV-visible-near infrared (UV-vis-NIR) transmittance spectra showed a strong near infrared shielding performance (80-90%) with excellent optical transparency (80-90%) in the visible light. This makes $Cs_xWO_3$ nanorods, with x=0.31, 0.32 and preferably x=0.33, attractive for optically transparent coating applications such as solar heat-shielding. Furthermore, the short reaction time (2 hour) and simple synthesis approach provides high percentage yield (95±3%) that is suitable for large-scale production.

Almost any Cs and W compounds may be used as starting materials, including halides (such as chlorides, bromide and iodides), oxides and hydroxides, carbonates, nitrates and acetates. The Cs/W atomic ratio is preferably 0.33.

The solvothermal process is carried out in a container which is both air and liquid tight, and which can withstand the pressures expect due to the temperature of the reaction and the solvent used. Benzyl alcohol has a boiling point of 205.3° C., so at higher temperatures significant pressure may develop. Preferably, the solvothermal process is carried out at a temperature of at least 200° C., more preferably at least 220° C., and most preferably at least 240° C., for example 220 to 260° C. including 225, 230, 235, 240, 245, 250 and 255° C. Preferably, the solvothermal process is carried out for a time of at most 4 hours, more preferably at most 2 hours, for example 1 to 3 hours including 1.5, 2 and 2.5 hours.

Any fatty acid having 10 to 30 carbon atoms may be used. Preferably, the fatty acid has 15 to 25 carbon atoms, such as 16, 17, 18, 19, 20, 21, 22, 23 and 24 carbon atoms. Preferably, the fatty acid is unsaturated, most preferably monounsaturated. Preferably, the fatty acid is oleic acid. Preferably, the fatty acid is used in an amount of 5 to 15 vol. %, more preferably 8 to 12 vol. %, such as 9, 10 and 11 vol. %.

Preferably, the $Cs_xWO_3$ produced are particles having an average length of the longest axis of 50 to 150 nm (including 60, 70, 80, 90, 100, 110, 120, 130 and 140 nm), and an average length of the shortest axis of 5 to 30 nm (including 6, 8, 10, 12, 14, 15, 16, 18, 20 and 25 nm). Preferably, the particles have an average aspect ratio 0.15 to 0.40, more preferably 0.20 to 0.35, including 0.21, 0.22, 0.23, 0.24, 0.25, 0.26, 0.27, 0.28, 0.29, 0.30, 0.31, 0.32, 0.33 and 0.34. The average length of the longest axes, the average length of the shortest axes and the average aspect ratio of the particles, are determined by examination of sets of particle by electron microscopy.

The particles size distribution is determined by dynamic light scattering (DLS). Preferably 95% of the particles have a particle size of at most 200 nm, more preferably at most 150 nm, or at most 100 nm. Preferably, 95% of the particles have a particle size of 50 to 250 nm, more preferably 70 to 200 nm, such as 80 to 150 nm, including 80 to 120 nm, 80 to 110 nm, 80 to 100 nm, 70 to 120 nm, 70 to 110 nm, and 70 to 100 nm.

The $Cs_xWO_3$ particles produced are highly crystalline. Preferably, an X-ray diffraction pattern under CuKα radiation of the $Cs_xWO_3$ particles have a (200) peak with a full-width at half-maximum (FWHM) intensity which is at most 150% of the full-width at half-maximum intensity of the (200) peak illustrated in FIG. 2(c), more preferably at most 125% of the full-width at half-maximum intensity of the (200) peak illustrated in FIG. 2(c), most preferably 110% of the full-width at half-maximum intensity of the (200) peak illustrated in FIG. 2(c), including 105% and 100%. The FWHM of the (200) peak in FIG. 2(c) is at most 1.0 (in 2θ units).

The $Cs_xWO_3$ particles produced have excellent absorption of near infrared light, while still having very good visible light transmittance. Preferably, a sample of the particles will have a peak in the visible light transmittance of at least 75% and a transmittance at 1400 nm of at most 20%; more preferably, a sample of the particles will have a peak in the visible light transmittance of at least 80% and a transmittance at 1400 nm of at most 15%; and most preferably, a sample of the particles will have a peak in the visible light transmittance of at least 80% and a transmittance at 1400 nm of at most 10%.

EXAMPLES

In this report of solvothermal synthesis of $Cs_xWO_3$ nanoparticles, cesium hydroxide and tungsten chloride were used as the source for Cs and W, and the reaction was conducted with benzyl alcohol as a solvent and oleic acid as a capping agent. The typical dark blue precipitate of $Cs_xWO_3$ nanoparticles is produced after 2 hour of solvothermal reaction at 240° C. followed by cooling at room temperature. Unreacted precursors and surfactant were washed and removed from the precipitate by centrifugation and re-dispersion method. A blue solid powder was obtained after the product was vacuum dried at 80° C. overnight. The EDS analysis of the sample, as shown in Table 1 and FIG. 1, confirms the presence of Cs and W elements with an atomic ratio composition of 0.31:1, close to the typical hexagonal tungsten bronze composition of $Cs_{0.32}WO_3$.

TABLE 1

EDS composition profile

| Element | Weight % | Atomic % |
|---|---|---|
| O | 20.1 ± 1.0 | 73.1 ± 3.7 |
| Cs | 14.7 ± 0.7 | 6.4 ± 0.3 |
| W | 65.1 ± 3.6 | 20.5 ± 1.0 |
| Total | 100.0 | |

Stable homogenous dispersion of nanoparticles in aqueous and non-aqueous solution is very important for high optical transparency. Simple blending of nanoparticles in solvents or organic polymers usually results in agglomeration and hence loss optical transparency due to intense light scattering (Rayleigh scattering). As synthesized, $Cs_xWO_3$ powder is insoluble in organic solvents such as toluene and ethanol, and semi-soluble in water. To achieve high optical transparency, we explored the dispersion of $Cs_xWO_3$ nanoparticles in the presence of surfactant. A dispersion of $Cs_xWO_3$ nanoparticles was carried out in water and ethyl alcohol. As-prepared, the product was readily dispersed in water but started to settle upon storage for more than 3 days. Samples dispersed in ethyl alcohol showed a little tendency to stabilize and settled within an hour. Samples dispersed in the presence of Triton X-100 give a stable dispersion with storage time that lasts for more than a week. Triton X-100 is a neutral surfactant that is compatible with many solvents and polymer emulsions. It provided stability by selectively adhering to the surface of $Cs_xWO_3$ nanorods and protecting aggregation by hindering the van der Waals force between the particles.

Materials

All chemicals were used as-received without any further purification. Tungsten (VI) chloride ($WCl_6$, ≥99.9% trace metals basis), cesium hydroxide ($CsOH.H_2O$, ≥90%), and triton X-100 (solution, 10% in $H_2O$) were purchased from Sigma-Aldrich. Benzyl alcohol ($C_6H_5CH_2OH$, 99%), and oleic acid ($C_{18}H_{34}O_2$, laboratory grade) were obtained from Fischer Scientific. Ethyl alcohol (200 proof, anhydrous ACS, USP grade) was purchased from Pharmco-Aaper. E-pure deionized (DI) water (18.2 MO cm) was obtained from a Millipore Milli-Q system our laboratory.

Synthesis

Cesium tungstate precursor samples were prepared as follows: a 0.62 g of $WCl_6$ was dissolved in 40 ml of anhydrous benzyl alcohol with a magnetic stirrer to give a yellowish color solution. In a separate beaker, 0.08 g of $CsOH.H_2O$ was dispersed in benzyl alcohol (30 ml to 16 ml, depending on the amount of oleic acid used) using a sonic dismembrator (Fischer scientific, 20 KHz output frequency). Sonication was performed at 30% amplitude for 2 min with on/off pulse of 5 s. The cesium hydroxide solution was then added to the tungsten chloride solution drop-wise to give a light brown solution. After the solution became homogenous under rapid magnetic stirring for 15-20 min, 0-20% oleic acid of desired percentage (corresponding to 0 ml, 3.5 ml, 7.0 ml, or 14 ml) of total volume of solvent was added and stirred magnetically for another 10 min. The reaction mixture was sealed in a Teflon-lined stainless steel autoclave and heated inside an oven at a desired temperature (180° C. to 240° C.) for a specified reaction time (2 hour to 8 hour). After natural cooling at room temperature, a dark blue precipitate was obtained and washed four times with anhydrous ethanol (95%) and water. Then, the resulting solid was vacuum dried overnight at 80° C.

Dispersion study of sample was conducted in water and ethyl alcohol. A required amount of $Cs_xWO_3$ nanorods was suspended in 10 ml deionized water and anhydrous ethyl alcohol at concentration of 3.0 mg $ml^{-1}$ and then a small amount of triton X-100 solution was added as a dispersant to the ethyl alcohol solution. Probe sonication was carried out for 90 s at 20 kHz, 30% amplitude, and 5 s on-off pulse to aid mixing and forming homogenous dispersion.

Instrumentation and Characterization

The crystal structure of the powder samples has been analyzed by a Miniflex x-ray diffractometer (XRD) using Cu-Kα radiation. A Hitachi H-600 TEM (transmission electron microscope) with 100 KeV potential was used to analyze the crystallinity and morphology of $Cs_xWO_3$ nanorods. High-resolution TEM (HRTEM) was used to analyze the nanorods' growth direction, lattice spacing and structure. Compositional and elemental study was performed with a liquid nitrogen-free standard energy-dispersive x-ray spectroscopy (EDX) detector (Oxford Instruments). Transmission/absorption measurements were carried out using a Varian Cary 5E UV-vis-NIR spectrophotometer with a wavelength range from 175 to 3 300 nm. Dynamic light scattering (DLS) was used to determine size distribution of $Cs_xWO_3$ nanoparticles dispersed in deionized water.

Effect of Capping Agent (Oleic Acid) Amount

Figure 2:
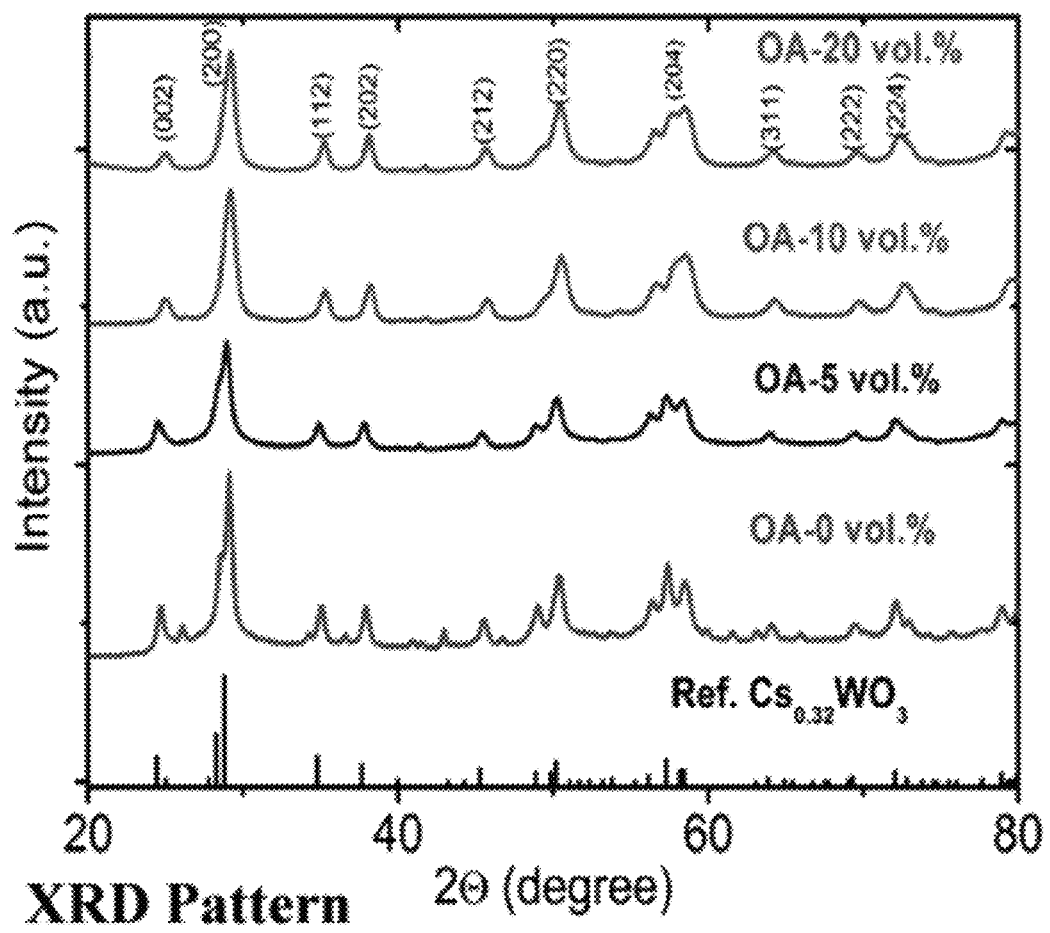
FIG. 2 is XDR patterns of the $Cs_xWO_3$ synthesized by solvothermal process, at 240° C. for 2 hours with oleic acid amounts of 0 vol. %, 5 vol. %, 10 vol. %, and 20 vol. %.

It is generally accepted that in solvothermal synthesis of metal oxide nanoparticles, surfactants play an important role in controlling size and morphology. Surfactants are crucial to control growth rate, prevent agglomeration and stabilize dispersion of nanoparticles by selectively adhering to specific facets of nanocrystals. As mentioned in the introduction section, long chain fatty acids such as oleic acid play an important role as surface capping agent in organic solvents [25-27]. Here we report the factor in the amount of oleic acid for controlling the morphology and size in synthesis of $Cs_xWO_3$ nanoparticle. FIG. 2 shows a digital and XRD pattern of $Cs_xWO_3$ nanoparticles synthesized in 2 hour by solvothermal process at 240° C. oven temperature with different amounts of oleic acid. The growth of the nanocrystals is achieved in solution phase by the introduction of dopant in kinetically controlled process. In this process, $Cs^+$ ions are introduced to $WO_6$ octahedral framework and make distorted reduce-type $Cs_xWO_3$ ($Cs_xW^{6+}_{1-x}W^{5+}_x$) nanoparticles [17]. Powder samples show typical blue color originated from chromophore of mixed valence W ions, $W^{6+}$ and $W^{5+}$ [9, 17, 28]. The color intensity that is associated with nanoparticles composition increases with the increase of oleic acid amount (from 0 vol. % to 20 vol. %). The change in color intensity occurred as a result of various valencies of tungsten. The various tungsten valencies in cesium tungsten oxide result from different Cs/W molar ratio. In solvothermal process the molar fraction of Cs doped in to $WO_6$ changes with the experimental conditions of the system. Therefore, the color change indicates that the cesium tungsten oxide crystalline phase had changed with the composition of solvents (benzyl alcohol and oleic acid). That is, mole fraction of cesium in cesium tungsten oxide increases as the amount of oleic acid in the solution mixture increases.

Figure 3A:
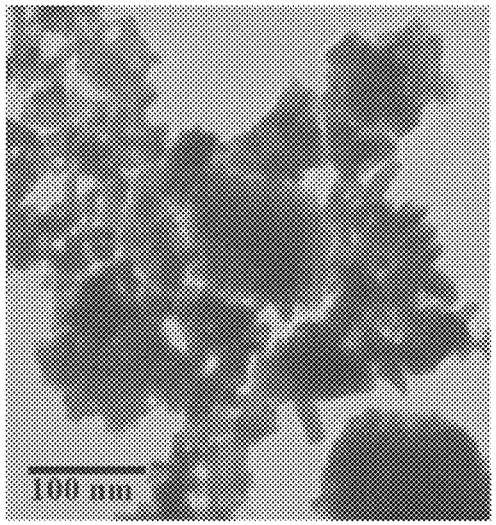
FIGS. 3A, 3B, 3C and 3D are TEM images of $Cs_xWO_3$ synthesized by solvothermal process, at 240° C. for 2 hours with oleic acid amounts of 0 vol. %, 5 vol. %, 10 vol. % and 20 vol. %, respectively.
Figure 3B:
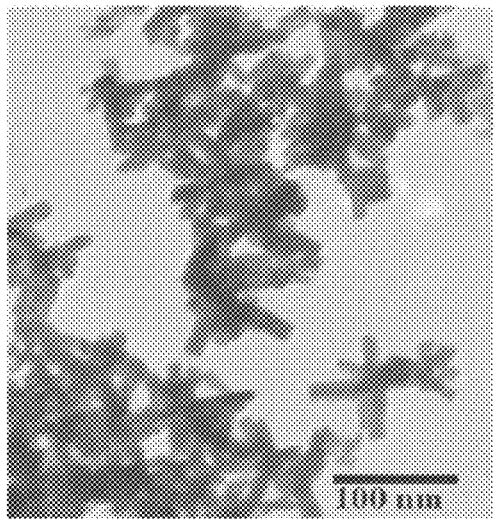

The X-ray diffraction (XRD) pattern of $Cs_xWO_3$ powder prepared using 5 vol. % or more oleic acid best matches with the hexagonal cesium tungsten bronze phase of $Cs_{0.32}WO_3$ (JCPDS No. 831334—a standard stick spectrum is also displayed at the bottom of FIG. 2 for comparison) among various tungsten oxide compounds, with no impurity identified. A slight increase in XRD peak broadening related to particle size decrease was observed with increase of oleic amount from 0 vol. % oleic acid (pure benzyl alcohol) to 20 vol. % oleic acid. When no surface capping agent was added XRD spectrum shows several weak impurity peaks at 2θ=28.1, 36.5, 43.2, which may be assigned to the rectangular slabs of tungsten trioxide ($WO_3$) [29, 30]. Furthermore, a number of peaks which could be attributed to impure crystalline phase are shown. It can be seen that the sample obtained in pure benzyl alcohol showed sharper peaks, indicating its larger particle size in comparison to those obtained in mixed solution. The impure phase of nanorods by pure benzyl alcohol was further confirmed by TEM images. Irregularly agglomerated bulk particles were formed (FIG. 3(a)) by employing benzyl alcohol as solvent with no oleic acid. In contrast, all samples prepared by mixed solution of benzyl alcohol and oleic acid consisted of a well-defined morphology with small particle size. Oleic acid is believed to control the agglomeration of nanoparticles by selectively adhering to certain facets of the particles and forming negatively charged particles that resulted in electrostatic repulsion. It is notable that $Cs_xWO_3$ synthesized with 10 vol. % oleic acid possesses well-dispersed homogenous nanorods with diameters of 15-30 nm and a length of 80-100 nm. Upon increasing oleic acid amount to 20 vol. %, a noticeable decrease in the particle size can be observed in FIG. 3(d). A higher ratio of oleic acid to benzyl alcohol leads to slower longitudinal nucleation and hence small growth of particles. This proves that, by adjusting the experimental conditions, a continuous tailoring of the size and morphology is achievable. Furthermore, the small size of the particles results in high surface energy that results in particle aggregation, as observed in FIG. 3(d).

Figure 3C:
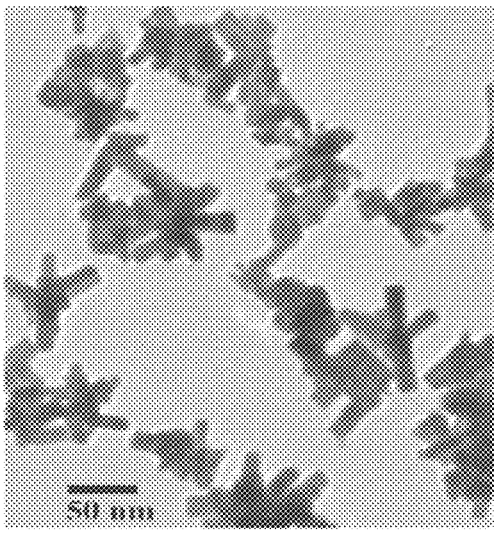
Figure 3D:
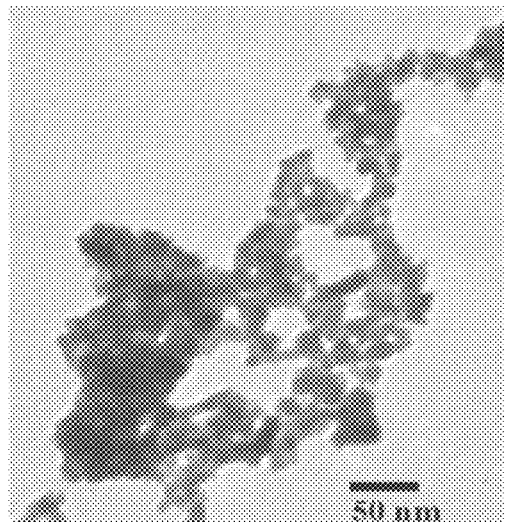
Figure 4A:
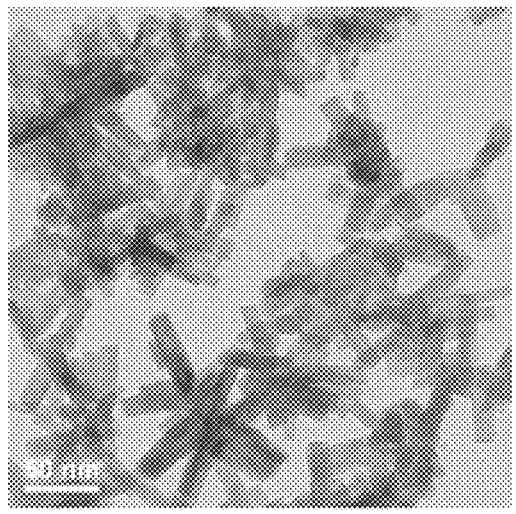
FIGS. 4A, 4B, 4C and 4D are TEM, ED and HRTEM images of $Cs_xWO_3$ synthesized using 10 vol. % oleic acid at 240° C. for 2 h: (A) low magnification TEM of nanorods; (B) fast Fourier transformation (inset) of the high-resolution TEM image of the nanorod; (C) and (D) HRTEM images of selected areas.
Figure 4B:
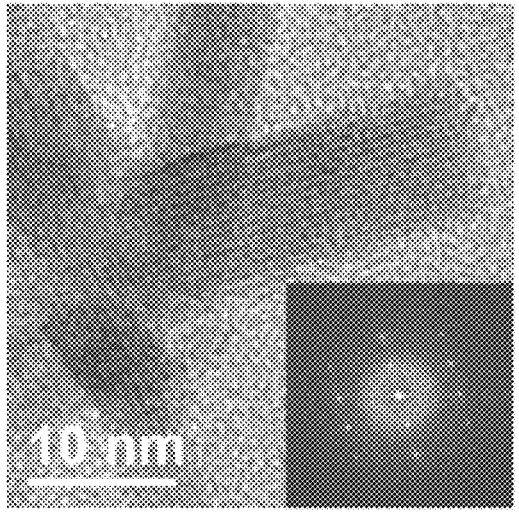
Figure 4C:
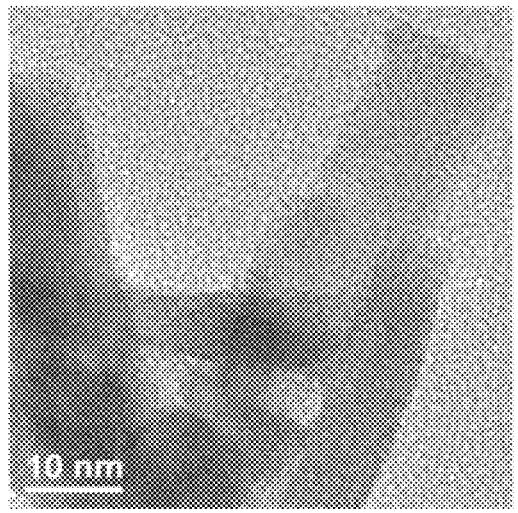
Figure 4D:
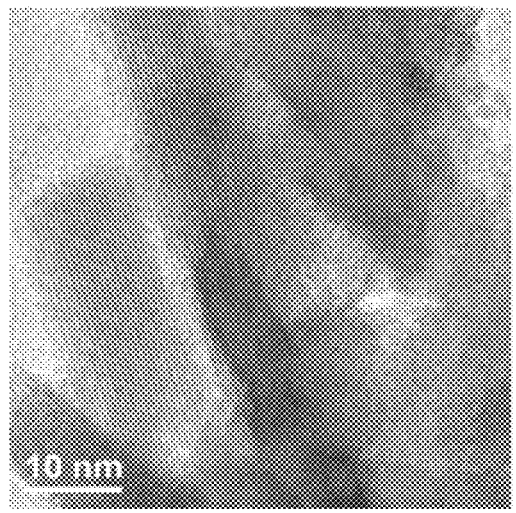

FIG. 4 shows low magnification TEM, high resolution TEM (HRTEM) and electron diffraction (ED) images of $Cs_xWO_3$ nanorods (FIG. 3(c)) synthesized in 10 vol. % oleic acid. Low magnification TEM image (FIG. 4(a)) indicated that, nanorods have homogenous size distribution. Fast Fourier transformation (the inset) of the high-resolution TEM image of the nanorod in FIG. 4(b) can be indexed as diffraction pattern along [1, 5, 10] using space group: P63/mcm(193) (ICSD#72619). An HRTEM image (FIG. 4(c)) showed that the preferential rod growth direction is along c-axis (with lattice space of 0.385 nm) and has a crystalline lattice of [002]. Furthermore, the plane perpendicular to c-axis has a hexagonal lattice structure with lattice spacing of 0.64 nm corresponding to [100] (FIG. 4(d)). In general the TEM and HRTEM images reveal that as synthesized $Cs_xWO_3$ has hexagonal crystalline structure with uniform particle size (~80 nm).

Figure 5A:
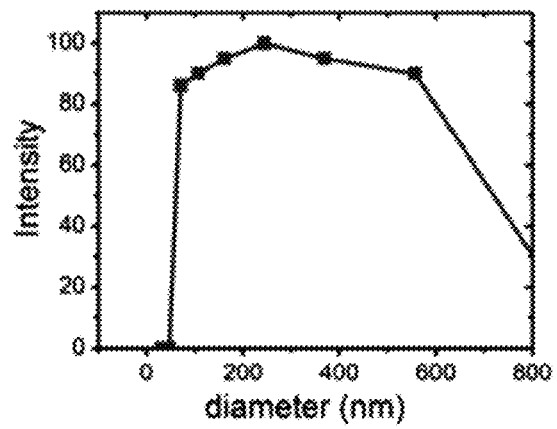
FIGS. 5A, 5B, 5C and 5D are graphs of particle size distributions determined by dynamic light scattering (DLS) of $Cs_xWO_3$ nanoparticles synthesized by 2 hour solvothermal process at 240° C. with oleic acid amounts of 0 vol. %, 5 vol. %, 10 vol. % and 20 vol. %, respectively.
Figure 5B:
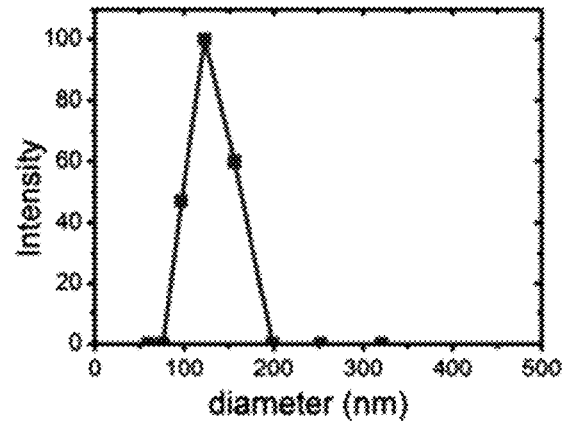
Figure 5C:
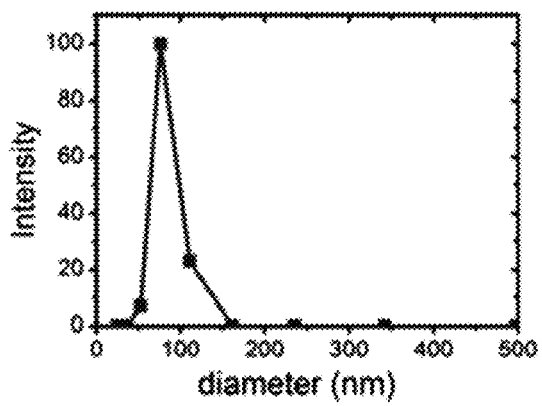
Figure 5D:
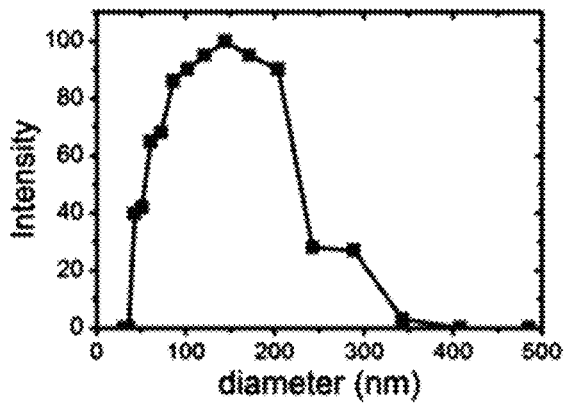
Figure 6:
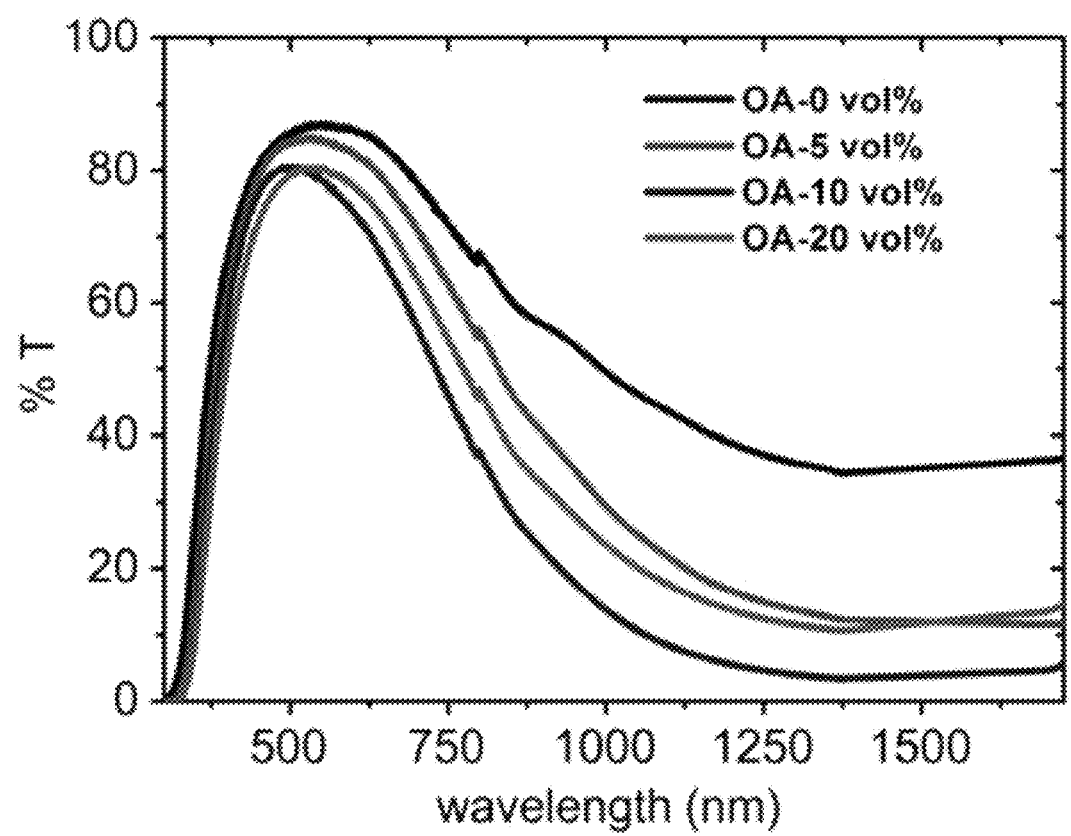
FIG. 6 is a graph of optical transmittance profiles of nanoparticles dispersed in water (0.37 mg ml$^{-1}$) of $Cs_xWO_3$ prepared by solvothermal process at 240° C. for 2 hour with different oleic acid amounts (0 vol. %, 5 vol. %, 10 vol. % and 20 vol. %).

The size controlled synthesis of $Cs_xWO_3$ nanoparticle can also be confirmed using size distribution measurement by dynamic light scattering (DLS) technique. The particle size distribution profile of the $Cs_xWO_3$ particles synthesized in pure benzyl alcohol (FIG. 5(a)) showed poly-dispersed particles that range from as low as 50 nm to 500 nm. In contrast, samples synthesized in benzyl-oleic acid mixed solutions with 5 vol. % and 10 vol. % oleic acid (FIGS. 5(b) and (c)) have homogenous and narrow particle size distributions. Also, it is notable that there is an increase in size distribution when oleic acid amount increases to 20 vol. %. This observation agrees well with the TEM image in FIG. 3(d), where particle size seems to decrease but their irregularity and aggregation increase. The above result confirms oleic acid plays important role in controlling homogeneity and particle size. The above interpretations can also be supported by analyzing the UV-vis-NIR transmittance spectra of $Cs_xWO_3$ samples (FIG. 6). Samples prepared by pure benzyl alcohol show a relatively lower absorption in the NIR region due to large particle size, low Cs/W ratio and also $WO_3$ impurity that are transparent in visible and NIR light [5, 6]. It can be seen that samples prepared in 5 vol. % and 10 vol. % oleic acid show an excellent absorption in NIR light. High transmittance of $Cs_{0.32}WO_3$ in the visible light suggests synthesis of nanorods with a uniform dispersity and small particle size. This excellent NIR absorption also confirms there is an increase of Cs/W atomic ratio compared to the sample synthesized with pure benzyl alcohol. That is, the amount of $Cs^+$ incorporated into $Cs_xWO_3$ results in contributing electron to the tungsten conduction band and hence affects NIR absorption [9]. This is primarily related to electronic structure of $Cs_{0.32}WO_3$, mainly plasmon resonance of free electrons on the surface of the nanorods [12, 34-37]. Electrons are introduced through dissociation of Cs in to $Cs^+$ and $e^-$. Those free electrons in nanoparticles interact with external electromagnetic wave and result in NIR absorption.

Effect of Reaction Temperature

Figure 7:
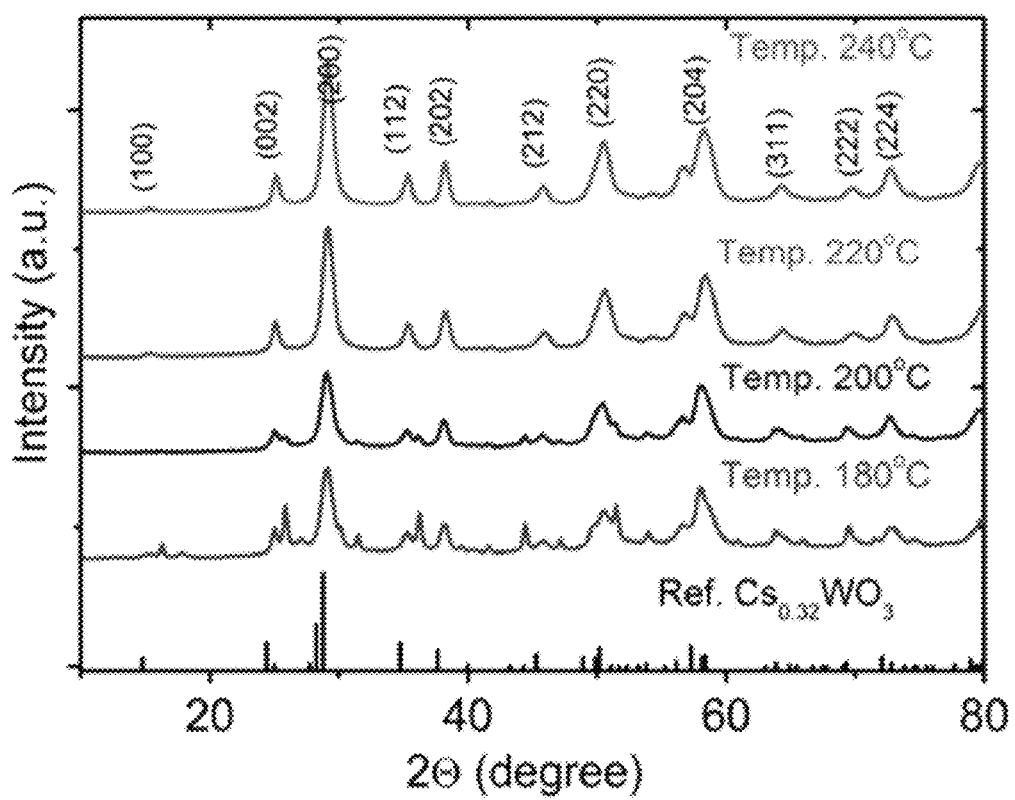
FIG. 7 is XRD patterns of $Cs_xWO_3$ nanoparticles synthesized by 2 hour solvothermal process with 10 vol. % oleic acid, at different reaction temperatures.
Figure 8A:
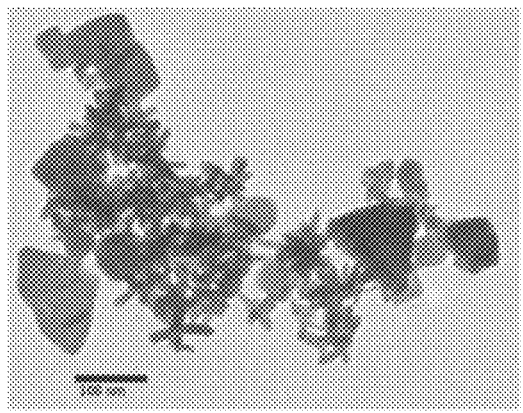
FIGS. 8A, 8B, 8C and 8D are TEM images of $Cs_xWO_3$ nanoparticles synthesized by 2 hour solvothermal process with 10 vol. % oleic acid amount at different reaction temperatures 180° C., 200° C., 220° C. and 240° C., respectively.
Figure 8B:
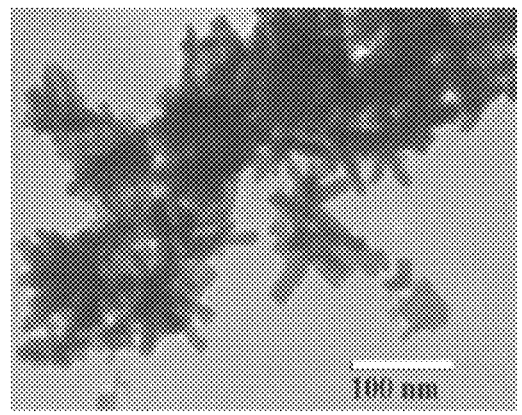
Figure 8C:
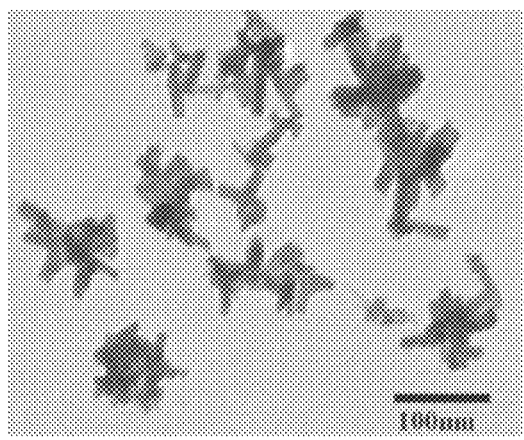
Figure 8D:
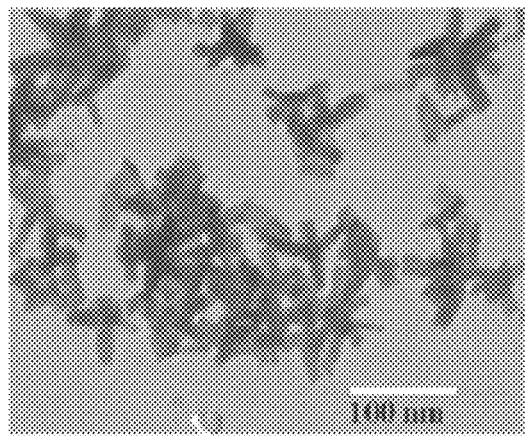
Figure 9A:
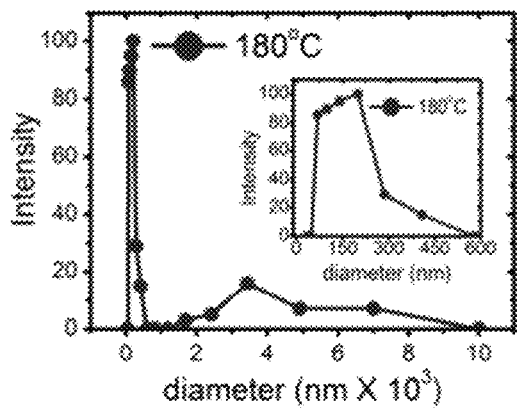
FIGS. 9A, 9B, 9C and 9D are a set of graphs of particle size distributions determined by DLS of $Cs_xWO_3$ nanoparticles synthesized by 2 hour solvothermal process with 10 vol % oleic acid at different reaction temperatures: 180° C., 200° C., 220° C. and 240° C., respectively.
Figure 9B:
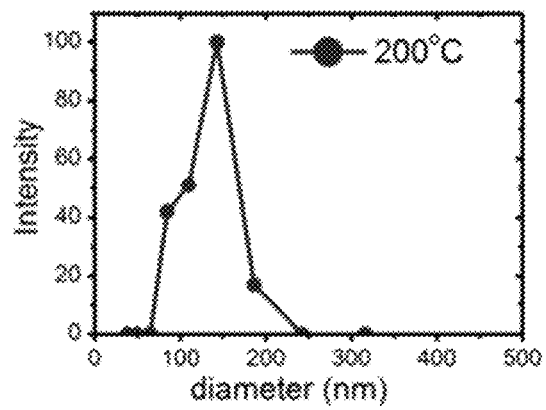
Figure 9C:
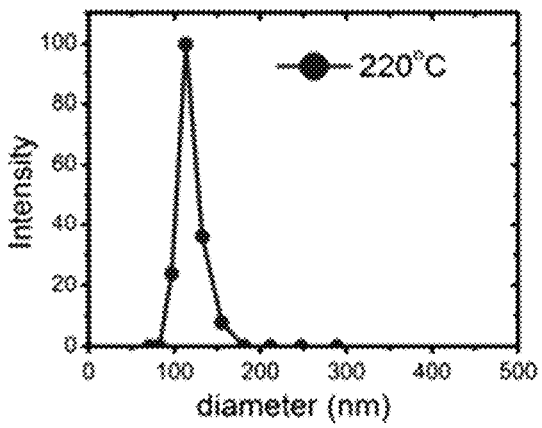
Figure 9D:
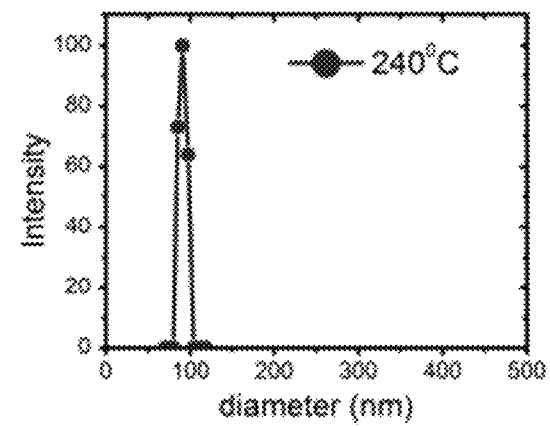

The solvothermal reactions at different oven temperatures were studied in order to determine the optimal reaction conditions, including the evaluation of the crystallization temperature necessary to obtain homogenous nanostructures of $Cs_xWO_3$. The reaction for the growth of nanorods was carried out by employing 10 vol. % oleic acid in benzyl alcohol, for a reaction time of 2 hour, and at controlled oven temperatures of 180° C., 200° C., 220° C. and 240° C. XRD technique was performed to investigate crystallographic structure of all samples. FIG. 7 exhibits the typical XRD patterns of the synthesized $Cs_{0.32}WO_3$ powder samples obtained by solvothermal reaction at different oven temperatures. Similar to FIG. 2, all XRD peaks of the four samples could be well indexed to a hexagonal structure of $Cs_xWO_3$ (JCPDS No. 831334) nanocrystals, as represented by the stick spectrum in the bottom of FIG. 7. Moreover, by following the diffraction line (200), an increase in peaks intensity was observed with increase in reaction temperature which could be attributed to an increase in crystallinity of $Cs_xWO_3$ product. At low reaction temperature (180° C.), the XRD spectral peaks in FIG. 7 show several impurity peaks at 2θ=28.1, 36.5, 43.2, and 51.0, which again can be assigned to the rectangular slabs of tungsten trioxide ($WO_3$) and in-pure phases that could result from incomplete reaction condition [28, 29]. As reaction temperature increased to 200° C., those impurity peaks started to reduce their intensities while other $Cs_xWO_3$ peaks intensified and sharpened. This observation strongly suggests that the reaction temperature for obtaining the homogenous nanostructures of $Cs_xWO_3$ should be higher than 220° C., or better yet 240° C.

Morphologies of $Cs_xWO_3$ nanocrystals obtained at different reaction temperatures were investigated by virtue of TEM as shown in FIGS. 8(a)-(d). The images show that the particles have homogenous distribution and that the particle crystalline structure became more defined with the increase of reaction temperature. Large rectangular slabs of $WO_3$ particles (as impurity assigned in FIG. 7) among rod shape of $Cs_xWO_3$ nanocrystals were observed at low reaction temperature (180° C., FIG. 8(a)). Aggregation also observed with low reaction temperature sample (200° C., FIG. 8(b)). Furthermore, with increasing the reaction temperatures to 220° C. and 240° C. (FIGS. 8(c)-(d)) the particle became more uniform in morphology, i.e., a pure phase of $Cs_xWO_3$ nanocrystals is observed.

The above observation can further be confirmed by size distribution measurement using dynamic light scattering (DLS), as shown in FIG. 9. At 180° C. synthesis temperature, a double loop of particle size distributions is shown in the DLS curve; a high intensity and narrower loop is corresponding to the nanostructures of $Cs_xWO_3$ and a low intensity and broader loop is related the large rectangular slabs of $WO_3$ impurities. When the synthesis reaction temperature is raised to 200° C., the low intensity and broader loop in the DLS curve has almost diminished, yet the high intensity and narrower loop still remains relatively broad (60-250 nm). Although the particle size of $Cs_xWO_3$ appears larger in the DLS measurement (FIG. 9) as compared to images taken by TEM (FIG. 8), the distribution becomes narrower with an increase in reaction temperature which confirms the synthesis of homogenous particles.

Figure 10:
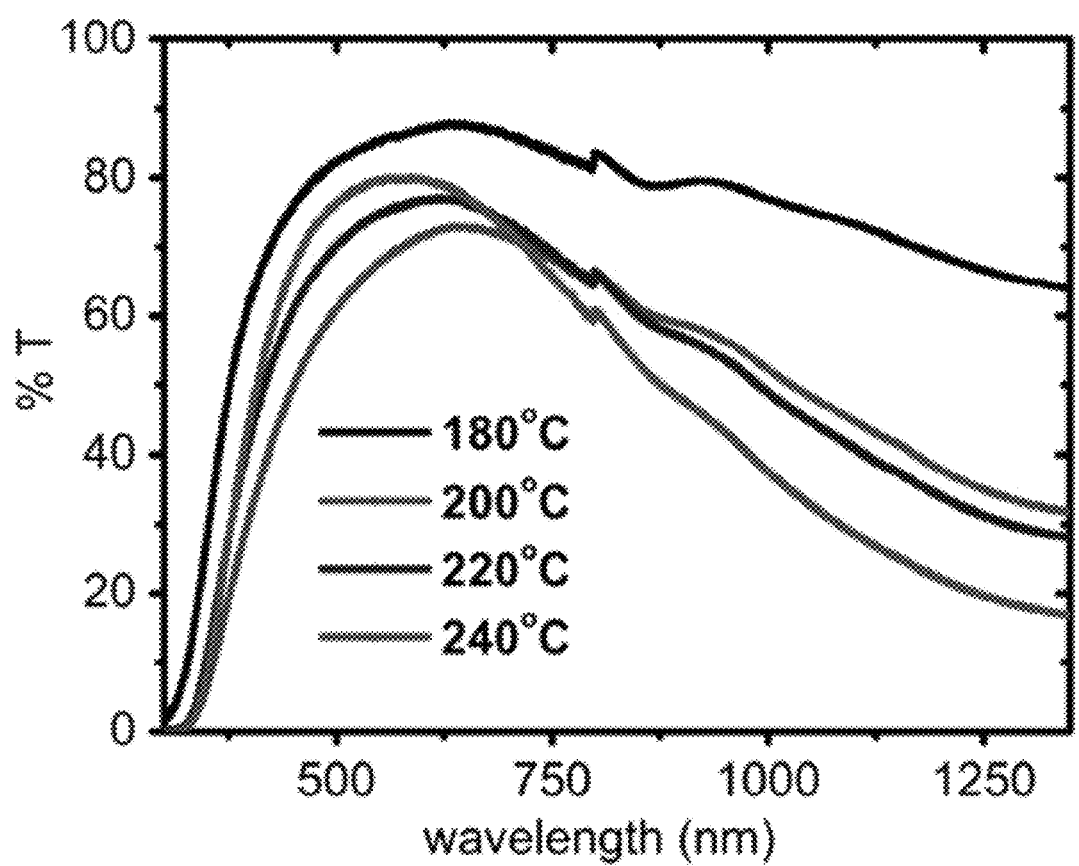
FIG. 10 is a graph of optical transmittance profiles of nanoparticles dispersed in water (4.9×10$^{-4}$ g mL$^{-1}$) of $Cs_xWO_3$ synthesized by 2 hour solvothermal process with 10 vol % oleic acid amount at different reaction temperatures.
Figure 11A:
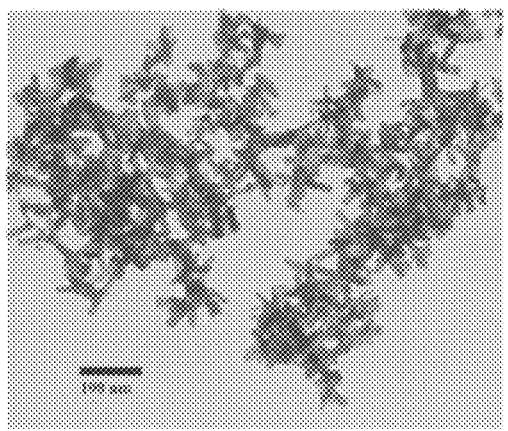
FIGS. 11A, 11B, 11C and 11D are TEM images of $Cs_xWO_3$ nanoparticles obtained by solvothermal process at 240° C. with 10 vol % oleic acid amount and reaction time of 2 h, 4 h, 6 h, and 8 h, respectively.
Figure 11B:
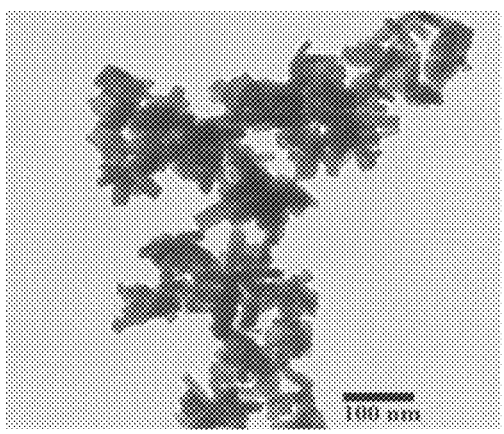
Figure 11C:
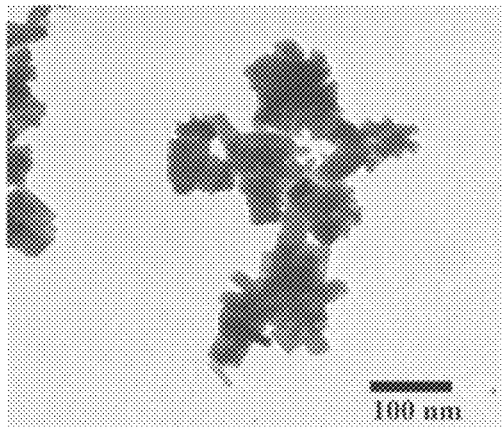
Figure 11D:
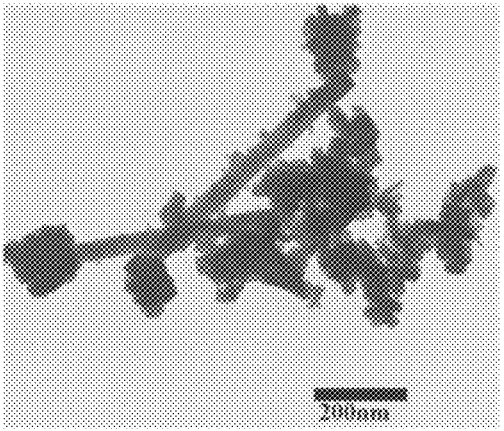
Figure 12A:
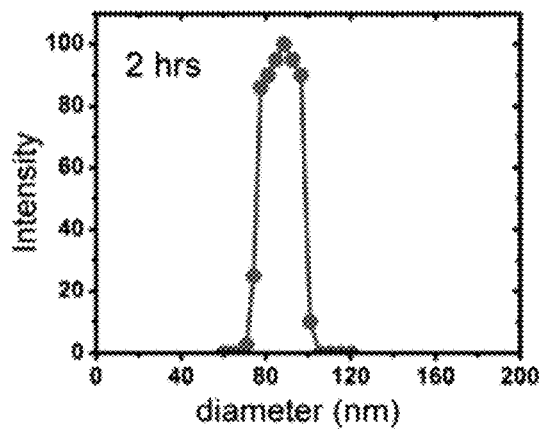
FIGS. 12A, 12B, 12C and 12D are a set of graphs of particle size distributions determined by DLS of $Cs_xWO_3$ nanoparticles obtained by 10 vol. % oleic acid amount at 240° C. with different reaction time, 2 hours, 4 hours, 6 hours and 8 hours, respectively.
Figure 12B:
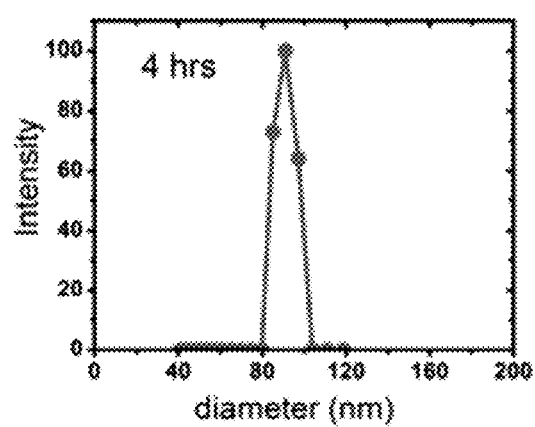
Figure 12C:
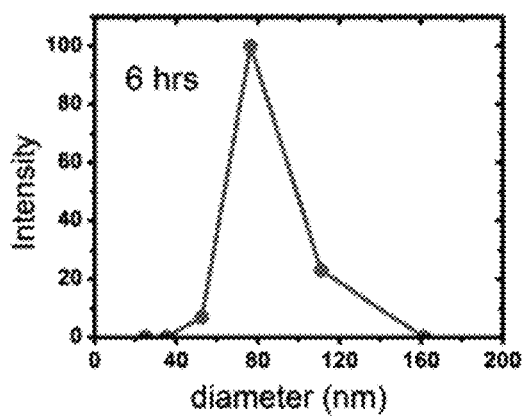
Figure 12D:
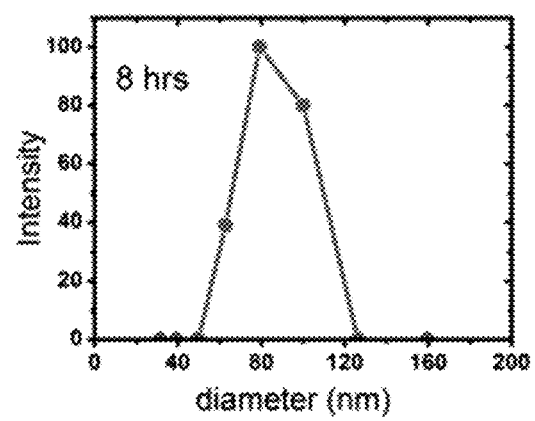

In the synthesis of $Cs_xWO_3$ nanocrystals at low reaction temperatures (as shown in FIGS. 8 and 9), an accompanying generation of large rectangular slabs impurity phase $WO_3$ is a disadvantage or not useful for the application of UV/NIR cut nanocoating. This is mainly due to the fact that $WO_3$ has been shown to be transparent in visible and NIR light [5, 6]. The UV-vis-NIR transmittance spectra for $Cs_xWO_3$ nanoparticles synthesized at different reaction temperatures are shown in FIG. 10. At 180° C. reaction temperature, a relatively high optical transparency (or low light shielding) from visible to NIR light is clearly observed. However, with increase in reaction temperature, $Cs_xWO_3$ dispersed solutions show a better transparency in the visible light region and stronger absorption in NIR range. The influence of reaction temperature on the optical performance mainly arises from change in Cs/W atomic ratio. As Guo et al. have reported there is an increase in Cs/W atomic ratio with increase in reaction temperature in solvothermal synthesis [9]. Furthermore, they reported that the Cs/W ratio should be close to 0.33 for better shielding performance. Hence, our result depicts that there is a clear increase in Cs/W atomic ratio associated with increase in oven temperature that results in excellent NIR shielding performance, while the transparency in the visible light region also increases.

Effect of Reaction Time (Ostwald Ripening Time)

All nanostructured materials possess a vast surface area and huge surface energy that are thermodynamically unstable or metastable. It is well understood that nanoparticles tend to aggregate to reduce the overall surface energy by combining the individual nanostructures together to form large structure through sintering or Ostwald ripening. Here, we studied reaction time to understand effect of Ostwald ripening in synthesis of $Cs_xWO_3$ nanoparticles. FIG. 11 shows TEM images of $Cs_xWO_3$ synthesized by solvothermal process at 240° C. with 10 vol % oleic acid amount and different reactions time of (a) 2 hour, (b) 4 hour, (c) 6 hour and (d) 8 hour. The images show a great sensitivity of Ostwald ripening time in the growth of nanorods. The observations indicate that samples prepared for 2 hour (FIG. 11(a)) and 4 hour (FIG. 11(b)) have uniform homogenous structure with rod lengths less than <100 nm, but with increase in reaction time the uniformity starts to dwindle. At 8 hour reaction time (FIG. 11(d)), the formation of elongated rod structures with lengths more than 600 nm along with smaller crystals structure was observed. The growth of the $Cs_xWO_3$ crystals is attributed to Ostwald ripening, which is the dissolution of small particles and re-crystallization into larger particles resulting from the increase of reaction time.

Figure 13:
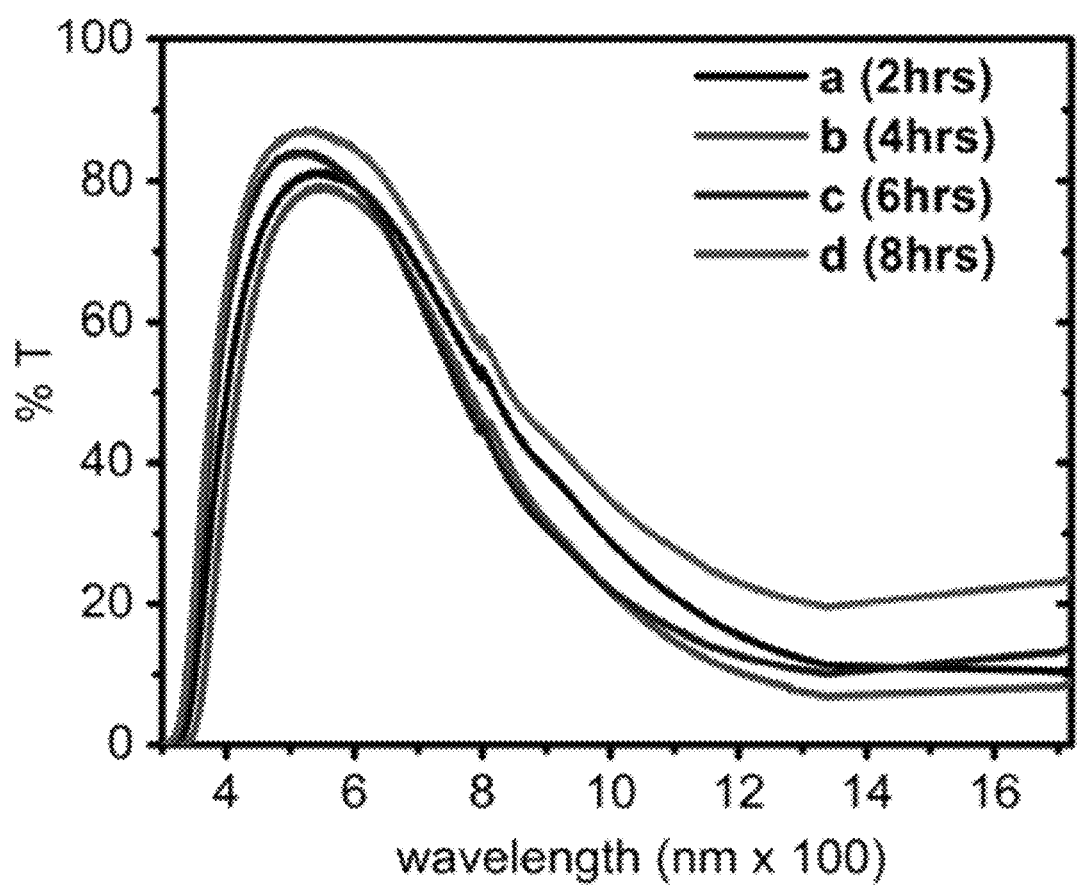
FIG. 13 is a graph of UV-visible-near infrared transmittance profiles of nanoparticles dispersed in water ($3.7 \times 10^{-4}$ g ml$^{-1}$) of $Cs_xWO_3$ synthesized at 240° C. and 10 vol. % oleic acid amount with different reaction time (a) 2 hours, (b) 4 hours, (c) 6 hours and (d) 8 hours.

The dynamic light scattering (DLS) measurements were also used to follow the Ostwald ripening effect in the size distribution of $Cs_xWO_3$ nanoparticles, as shown in FIG. 12. There is uniform size distribution for samples prepared at 2 hour (70-100 nm) and 4 hour (80-100 nm) that agrees well with observations made by TEM images. Samples prepared at longer ripening time (FIGS. 12(c) and (d)) show broad size distributions (40-120 nm), which agree with the possibility of dissolution and re-crystallization process during the solvothermal synthesis. UV-vis-NIR transmittance spectra of $Cs_xWO_3$ crystals are a good indication to provide guidelines about the quality (size and uniformity) of nanomaterials synthesized. Under the optimized reaction conditions, 10 vol. % oleic acid amount, at 240° C. and 2 hour reaction time, FIG. 13 shows high optical transparency (80-90%) in the visible light range and excellent shielding ability in the NIR (80-90%) region. The results also indicated that there is no significant difference in transmittance (visible light) and absorption (NIR range) of samples prepared at different reaction times. It is noteworthy to mention that no significant changes in the particle size and UV-vis-NIR performance were recorded after a lengthy reaction time. This suggests that a short reaction time of 2 hour is sufficient to prepare $Cs_xWO_3$ nanoparticles with a desired size and morphology.

REFERENCES

[1] Park B, Kang B, Bu S, Noh T, Lee J and Jo W 1999 Nature 401 682-4
[2] Dimos D and Mueller C 1998 Annu. Rev. Mater. Sci. 28 397-419
[3] Ellis A B, Kaiser S W and Wrighton M S 1976 J. Am. Chem. Soc. 98 6855-66
[4] Sharan A, An I, Chen C, Collins R W, Lettieri J, Jia Y, Schlom D G and Gopalan V 2003 Appl. Phys. Lett. 83 5169-71
[5] Bamwenda G R, Sayama K and Arakawa H 1999 J. Photochem. Photobiol. A 122 175-83
[6] Granqvist C G 2000 Sol. Energy Mater. Sol. Cells 60 201-62
[7] Shanks H, Sidles P and Danielson G 1963 Adv. Chem. Ser. 39 237-45
[8] Takeda H and Adachi K 2007 J. Am. Ceram. Soc. 90 4059-61
[9] Guo C, Yin S, Yan M and Sato T 2011 J. Mater. Chem. 21 5099-105
[10] Liu J X, Ando Y, Dong X L, Shi F, Yin S, Adachi K, Chonan T, Tanaka A and Sato T 2010 J. Solid State Chem. 183 2456-60
[11] Chen C J and Chen D H 2013 Nanoscale Res. Lett. 8 1-8
[12] Guo C, Yin S, Zhang P, Yan M, Adachi K, Chonan T and Sato T 2010 J. Mater. Chem. 20 8227-9
[13] Mamak M, Choi S Y, Stadler U, Dolbec R, Boulos M and Petrov S 2010 J. Mater. Chem. 20 9855-7
[14] Adachi K and Asahi T 2012 J. Mater. Res. 27 965-70
[15] Kim Y J, Yoon H J, Jeong Y S, Lee S, Shin J G and Choi K H 2012 3rd IPCBEE. 46 38-42
[16] Guo C, Yin S, Adachi K, Chonan T and Sato T 2011 IOP Conf. Ser. Mater. Sci. Eng. 18 032014
[17] Guo C, Yin S, Huang L and Sato T 2011 ACS Appl. Mater. Interfaces 3 2794-9
[18] Niederberger M 2007 Acc. Chem. Res. 40 793-800
[19] Pinna N, Karmaoui M and Willinger M G 2011 J. Sol-Gel Sci. Technol. 57 323-9
[20] Niederberger M, Pinna N, Polleux J and Antonietti M 2004 Angew. Chem. Int. Ed. 43 2270-3

[21] Wang J, Pang X, Akinc M and Lin Z 2010 J. Mater. Chem. 20 5945-9
[22] Niederberger M, Bartl M H and Stucky G D 2002 Chem. Mater. 14 4364-70
[23] Bilecka I, Elser P and Niederberger M 2009 ACS Nano 3 467-77
[24] Niederberger M and Garnweitner G 2006 Chem. Eur. J. 12 7282-302
[25] Yang J G, Zhou Y L, Okamoto T, Bessho T, Satake S, Ichino R and Okido M 2006 Chem. Lett. 35 1190
[26] Wang Y and Yang H 2006 Chem. Commun. 24 2545-7
[27] Wang C Y, Hong J M, Chen G, Zhang Y and Gu N 2010 Chin. Chem. Lett. 21 179-82
[28] Moon K, Cho J J, Lee Y B, Yoo P J, Bark C W and Park J 2013 Bull. Korean Chem. Soc. 34 731
[29] Zhu J, Wang S, Xie S and Li H 2011 Chem. Commun. 47 4403-5
[30] Rajagopal S, Nataraj D, Mangalaraj D, Djaoued Y, Robichaud J and Khyzhun O Y 2009 Nanoscale Res. Lett. 4 1335-42
[31] Buonsanti R, Grillo V, Carlino E, Giannini C, Kipp T, Cingolani R and Cozzoli P D 2008 J. Am. Chem. Soc. 130 11223-33
[32] Levy M, Quarta A, Espinosa A, Figuerola A, Wilhelm C, Garcia-Hernandez M, Genovese A, Falqui A, Alloyeau D and Buonsanti R 2011 Chem. Mater. 23 4170-80
[33] Buonsanti R, Carlino E, Giannini C, Altamura D, De Marco L, Giannuzzi R, Manca M, Gigli G and Cozzoli P D 2011 J. Am. Chem. Soc. 133 19216-39
[34] Liu J X, Ando Y, Dong X L, Shi F, Yin S, Adachi K, Chonan T, Tanaka A and Sato T 2010 J. Solid State Chem. 183 2456-60
[35] Buonsanti R and Milliron D J 2013 Chem. Mater. 25 1305-17
[36] Lounis S D, Runnerstrom E L, Llordés A and Milliron D J 2014 J. Phys. Chem. Lett. 5 1564-74
[94] [37] Mattox $T_M$, Bergerud A, Agrawal A and Milliron D J 2014 Chem. Mater. 2014 1779-84

What is claimed is:

1. A method of preparing $Cs_xWO_3$ particles, comprising: heating a composition containing:
   (1) cesium,
   (2) tungsten,
   (3) a solvent, and
   (4) a fatty acid,
   at a temperature of at least 240° C. for at most 2 hours, to produce $Cs_xWO_3$ particles, with x=0.31-0.33;
   wherein the solvent comprises benzyl alcohol,
   the fatty acid comprises a fatty acid having 10 to 30 carbon atoms, and
   the fatty acid is present in an amount of 5-15 vol. %.

2. The method of claim 1, wherein the fatty acid comprises a fatty acid having 16 to 20 carbon atoms.

3. The method of claim 2, wherein the fatty acid comprises a monounsaturated fatty acid.

4. The method of claim 1, wherein the fatty acid comprises oleic acid.

5. The method of claim 1, wherein:
   (i) at least 95% of particles have a particle size of 50 to 150 nm as determined by dynamic light scattering, and
   (ii) a sample of the particles has a peak in the visible light transmittance of at least 75% and a transmittance at 1400 nm of at most 20%.

6. The method of claim 5, wherein (iii) an X-ray diffraction pattern under CuKα radiation of the $Cs_xWO_3$ particles have a (200) peak with a full-width at half-maximum intensity which is at most 110% of the full-width at half-maximum intensity of the (200) peak illustrated in FIG. 2 (OA-10 vol. %).

7. The method of claim 5, wherein (i) at least 95% of particles have a particle size of 80 to 120 nm as determined by dynamic light scattering.

8. The method of claim 5, wherein (ii) a sample of the particles has a peak in the visible light transmittance of at least 80% and a transmittance at 1400 nm of at most 15%.

9. The method of claim 7, wherein (ii) a sample of the particles has a peak in the visible light transmittance of at least 80% and a transmittance at 1400 nm of at most 10%.

10. The method of claim 9, wherein (iii) an X-ray diffraction pattern under CuKα radiation of the $Cs_xWO_3$ particles have a (200) peak with a full-width at half-maximum intensity which is at most 100% of the full-width at half-maximum intensity of the (200) peak illustrated in FIG. 2 (OA-10 vol. %).

11. The method of claim 1, wherein:
   the fatty acid comprises a fatty acid having 16 to 20 carbon atoms, and
   the fatty acid comprises a monounsaturated fatty acid.

12. The method of claim 5, wherein (iii) an X-ray diffraction pattern under CuKα radiation of the $Cs_xWO_3$ particles have a (200) peak with a full-width at half-maximum intensity which is at most 100% of the full-width at half-maximum intensity of the (200) peak illustrated in FIG. 2 (OA-10 vol. %).

13. The method of claim 1, wherein at least 95% of particles have a particle size of 70 to 150 nm as determined by dynamic light scattering.

14. The method of claim 1, wherein a sample of the particles has a peak in the visible light transmittance of at least 80% and a transmittance at 1400 nm of at most 10%.

* * * * *